United States Patent [19]

Ecker

[11] 4,380,156
[45] Apr. 19, 1983

[54] MULTIPLE SOURCE HEAT PUMP

[75] Inventor: Amir L. Ecker, Duncanville, Tex.

[73] Assignee: Atlantic Richfield Company, Los Angeles, Calif.

[21] Appl. No.: 330,005

[22] Filed: Dec. 11, 1981

Related U.S. Application Data

[63] Continuation-in-part of Ser. No. 125,503, Feb. 28, 1980, abandoned, Ser. No. 50,548, Jun. 21, 1979, and Ser. No. 45,392, Jun. 4, 1979.

[51] Int. Cl.³ ............................................. F25B 29/00
[52] U.S. Cl. .................................. 62/235.1; 62/238.7; 62/324.6
[58] Field of Search ................. 62/235.1, 238.6, 238.7, 62/324.6, 324.1; 237/2 B

[56] References Cited

U.S. PATENT DOCUMENTS

| | | | |
|---|---|---|---|
| 2,751,761 | 6/1956 | Borgerd | 62/238.7 |
| 3,301,002 | 1/1967 | McGrath | 62/238.7 X |
| 4,012,920 | 3/1977 | Kirschbaum | 62/238.7 X |
| 4,165,037 | 8/1979 | McCarson | 62/235.1 X |
| 4,196,595 | 4/1980 | Shaw | 62/324.1 X |
| 4,226,606 | 10/1980 | Yaeger et al. | 62/238.6 |
| 4,256,475 | 3/1981 | Schafer | 62/238.7 X |
| 4,257,239 | 3/1981 | Partin et al. | 62/238.7 |

Primary Examiner—William E. Tapolcai
Attorney, Agent, or Firm—Wofford, Fails & Zobal

[57] ABSTRACT

A heat pump apparatus for conditioning a fluid characterized by a fluid handler and path for circulating a fluid in heat exchange relationship with a refrigerant fluid, at least three refrigerant heat exchangers, one for effecting heat exchange with the fluid, a second for effecting heat exchange with a heat exchange fluid, and a third for effecting heat exchange with ambient air; a compressor for compressing the refrigerant; at least one throttling valve connected at the inlet side of a heat exchanger in which liquid refrigerant is vaporized; a refrigerant circuit; refrigerant; a source of heat exchange fluid; heat exchange fluid circuit and pump for circulating the heat exchange fluid in heat exchange relationship with the refrigerant; and valves or switches for selecting the heat exchangers and directional flow of refrigerant therethrough for selecting a particular mode of operation. Also disclosed are a variety of embodiments, modes of operation, and schematics therefor.

9 Claims, 8 Drawing Figures

MULTIPLE SOURCE HEAT PUMP

CROSS REFERENCE TO RELATED APPLICATIONS

This application is a continuation-in-part of application Ser. No. 125,503, filed Feb. 28, 1980, now abandoned, same title and inventor; application Ser. No. 50,548, filed June 21, 1979, entitled "HEAT PUMP EMPLOYING OPTIMAL REFRIGERANT COMPRESSOR FOR LOW PRESSURE RATIO APPLICATIONS"; inventor Amir L. Ecker; and application Ser. No. 45,392, filed June 4, 1979; entitled "HEAT EXCHANGER-ACCUMULATOR"; inventor Amir L. Ecker.

FIELD OF THE INVENTION

This invention relates to apparatus for conditioning a fluid; such as air used in cooling or heating an enclosed space in which the air is circulated in heat exchange relationship with a refrigerant fluid. More particularly, this invention relates to heat pump apparatus for conditioning an enclosed space and employing in combination a supplemental fluid assist for most efficient operation.

DESCRIPTION OF THE PRIOR ART

As described in my prior co-pending applications Ser. No. 45,392 and 50,548, the descriptive matters of which are incorporated herein by reference for details omitted herefrom, the prior art is replete with a wide variety of types of apparatuses for air conditioning enclosed spaces, such as buildings or the like. Heat pumps have been used to pump heat from one location into another at a coefficient of performance greater than one, or more economically than the heat could be generated if the enclosed space is to be heated as by electrical heaters. As is recognized, in heat pump systems heat is absorbed by a refrigerant by vaporizing the condensed liquid refrigerant which then allows the refrigerant to be taken into the compressor as a gas. The compressor compresses the gas to a high pressure, high temperature gas that is then condensed in a condenser to a relatively warm liquid. The liquid is then flashed past some expansion means to an evaporator where it is vaporized to a gas to repeat the cycle. As will be apparent, in the condenser, heat is given up to a heat exchange fluids. On the other hand, in the evaporator, heat is absorbed from a heat exchange fluid. The heat pumps can therefore be employed to either heat fluid, such as the air being circulated in an enclosed space, or to cool the fluid by employing the heat exchangers in either the condensing mode or the evaporating mode.

There have been many types of heat transfer systems for accomplishing this. For example, there have been systems for heat exchanging directly with ambient air such as air to air heat pumps. The problem with these systems during the heating mode is that formation of condensation followed by freezing of liquid condensate on the fins block air passages on the evaporator surface of the outdoor coil. Moreover, in cold winter operation, the temperature of the outside air was low enough to render the heat pump relatively inefficient due to excessive loss of capacity except in certain geographical areas where the average ambient temperature was relatively high. In particular, temperatures below about twenty degrees F. (20°F.) ambient temperature, the heat pump has been so inefficient with conventional compressor design and heat exchanger design as to be of questionable usefulness.

There have also been employed liquid-air heat pump-systems in which liquids, such as water from wells penetrating the earth formations, were used to supply heat to vaporize the liquid refrigerant. These systems have employed expensive dual pipe arrangements in which an inner conduit was maintained concentrically within an outer conduit. As a consequence, there has been no place for the liquid refrigerant to separate from the general vapors and the vapors occupy heat transfer surface and serve to reduce the heat transfer area. This increased the expense of such equipment and has a detrimental impact on system efficiency. Moreover, the pressure drop through such conventional tube-in-tube heat exchangers has hurt performance of the heat pump unit, particularly where such devices were connected in series flow path configuration, as was the usual practice.

Typical of the prior art systems are the following U.S. patents which include U.S. Pat. Nos. 1,101,001; 1,130,870; 1,683,434; 2,559,870; 3,178,113; 3,263,493 and 4,049,407. There is also an article appearing in the Washington Post on Oct. 12, 1974, entitled "Heat Pump, A Key To Solar Heating". These systems have, in part, various approaches to providing supplemental heat, such as burying the evaporator in the earth and putting heat into the earth about the evaporator, the heat coming from a variety of sources such as solar heat exchangers or the like.

A variety of other approaches has been delineated in patents such as the following U.S. Pat. Nos. 2,829,504; 2,847,190; 2,693,939; 2,689,090; 2,584,573; 2,188,811; 3,189,085; 2,970,817; 4,062,489; 4,065,938; and 4,112,920. In these references, the supplemental sources have been provided for defrosting, and deicing the respective heat exchangers when they have frozen up.

Also pertinent are the following articles and patents.

In January, 1979 an issue of "Air Conditioning And Refrigeration Business", there is an article entitled "Suction-Line Accumulators For Heat Pumps"; Darwin R. Grahl. Also, patents that are more pertinent in a detailed way may be the following U.S. Pat. Nos. 3,242,679 shows a solar unit with pipes in the evaporator. 3,488,678 shows a u-pipe with a capillary in the bottom and a separate inlet. 3,512,374 shows a suction accumulator with an inline intake-discharge. 3,563,053 shows a suction accumulator with similar tube arrangement to 3,488,678. 3,600,940 shows liquid level sensor in an accumulator. 3,609,990 shows a suction accumulator with a tube arrangement similar to 3,488,678. 3,765,192 shows an evaporator with a coil and a spray apparatus to spray liquid up on the coil with an exterior space around the coil for passage of the gas to the top outlet.

In none of these systems is there provided the flexibility of having three refrigerant heat exchangers in an all encompassing system such that no part of the system need be pumped down and valved off in particular modes of operation. Moreover, these prior art systems do not take advantage of the flexibility afforded by three or more refrigerant heat exchangers for efficient operation, as by chilling water during a period of low demand such that the water can be employed later for supplemental cooling during periods of high demand.

Moreover, the prior art systems have not provided various physical arrangements that eliminate the necessity for reversing and pumping down a particular segment of the refrigerant cycle, eliminate the necessity for reversing valves or allow taking advantage of the particular heating and cooling effects attendant to having the compressor and the hot refrigerant heat exchangers on one side of an insulated divider on a reversing means and having the cooling refrigerant heat exchanger on opposite side of an insulating divider on the reversing means to take advantage of the respective heating and cooling effects in the respective heating and cooling modes of operation.

SUMMARY OF THE INVENTION

Accordingly, it is an object of this invention to provide apparatus for conditioning a fluid, such as air being circulated in an enclosed space, by pumping heat by means of a refrigerant fluid and exchanging with the fluid being circulated, that obviates the disadvantages of the prior art and provides one or more of the features delineated hereinbefore as not being provided by the prior art.

It is a particular object of this invention to provide a heat pump that is operable in both the heating and cooling mode and has a wide range of flexibility without requiring isolating portions of a refrigerant circuit and pumping down that portion of the circuit, yet does not require large capacity of refrigerant that would decrease overall efficiency; the heat pump being designed for optimum conditions to take advantage of a supplemental heat exchange fluid for more efficient operation in either or both of the heating and cooling modes.

These and other objects will become apparent from the descriptive matter hereinafter, particularly when taken in conjunction with the appended drawings.

In accordance with this invention, there is provided an apparatus for conditioning a fluid comprising:

a. a fluid handler and fluid path means for circulating the fluid in a path in heat exchanger relationship with a refrigerant fluid;

b. at least three refrigerant exchangers, a first refrigerant-fluid heat exchanger being at least disposable in the path of the fluid such that the fluid is passed in heat exchange relationship therewith, a second refrigerant-heat exchange fluid heat exchanger for circulating the refrigerant in heat exchange relationship with the heat exchange fluid; and a third refrigerant-ambient air heat exchanger at least disposable in a path of ambient air for circulating the refrigerant in heat exchange relationship with ambient air;

c. at least one compressor for efficiently compressing the refrigerant from its inlet pressure as a gas to its discharge pressure as a high pressure gas under the conditions of operation of a refrigerant circuit;

d. at least one throttling valve connected at the inlet of a heat exchanger in which liquid refrigerant is being vaporized to a gaseous refrigerant;

e. a refrigerant circuit serially connecting the at least three heat exchangers, the throttling valve, and the compressor and defining a flow path for the refrigerant;

f. means for selecting the heat exchangers and direction of flow of refrigerant therethrough for selecting a particular mode of operation;

g. refrigerant disposed in the refrigerant circuit and adapted to be circulated in a selected flow path for transferring heat;

h. a source of heat exchange fluid;

i. heat exchange fluid circulating means for circulating the heat exchange fluid in heat exchange relationship with the refrigerant; and j. heat exchange fluid circuit serially connecting the heat exchange fluid source and the circulating means and the second refrigerant-heating fluid heat exchanger.

In one embodiment of this invention, a reversing valve is employed to enable operation in either the heating or cooling mode; including operating to chill water during periods of low electrical demand so as to utilize off-peak electrical rates so that the chilled water can be employed to augment the cooling during periods of high demand.

In another embodiment, two compressors and two refrigerant circuits including additional heat exchangers are employed without the use of the reversing valve to enable operation in the respective heating and cooling modes.

In still another embodiment of this invention, the entire three heat exchangers and compressors are mounted on a reversing means with an insulating wall between the cooling heat exchanger and the heat producing heat exchanger and compressor; the reversing means being capable of being rotated at least one hundred and eighty degrees (180°) to interpose the heat producing elements in the stream in which heat is employed and to interpose the evaporator heat exchanger in the stream where cooling is being employed, the insulating wall affording heat insulation between the two. In this embodiment, the facile rotation of the reversing means enables designing the respective heat exchangers for optimum operation; for example the condenser can be designed solely to be employed as a condenser for condensening operation for the greatest efficiency and the heat exchanger to be employed as the evaporator can be designed for optimum design solely as an evaporator.

BRIEF DESCRIPTION OF DRAWINGS

FIG. 1a is schematic view of a reversing valve in a heating mode.

FIG. 1b is a schematic view of a reversing valve in a cooling mode.

DESCRIPTION OF THE PREFERRED EMBODIMENTS

As described in my hereinbefore referenced copending application Ser. No. 50,548, virtually all of the compressors employed in heat pumps of the prior art and having a heating mode of operation were reciprocating compressors. In that application, there is described the advantages of designing the compressor to take advantage of low pressure ratios that are available by using either high suction pressures or low discharge pressures. High suction pressures are attainable by using high level evaporating temperatures; for example, on the order of 50° to 80° F. even in winter operation as constrasted to the 20° F. frequently encountered in ambient air in less temperate climates. The low discharge pressures are possible by using a liquid heat exchange fluid that has a much lower temperature than summer ambient air; for example, on the order of 60–80° F., compared to ambient air temperatures of 90° to 110° F. One of the advantages of this invention is that it can employ advantageously the same concept described in that application, including the use of low pressure ratios and rotary compressors designed for the low pressure ratios for efficient operation. Primarily, however, this invention results from the high degree of flexiblity obtainable from the use of at least three heat exchangers such as described with the respect to the figures hereinafter.

Figure 1:
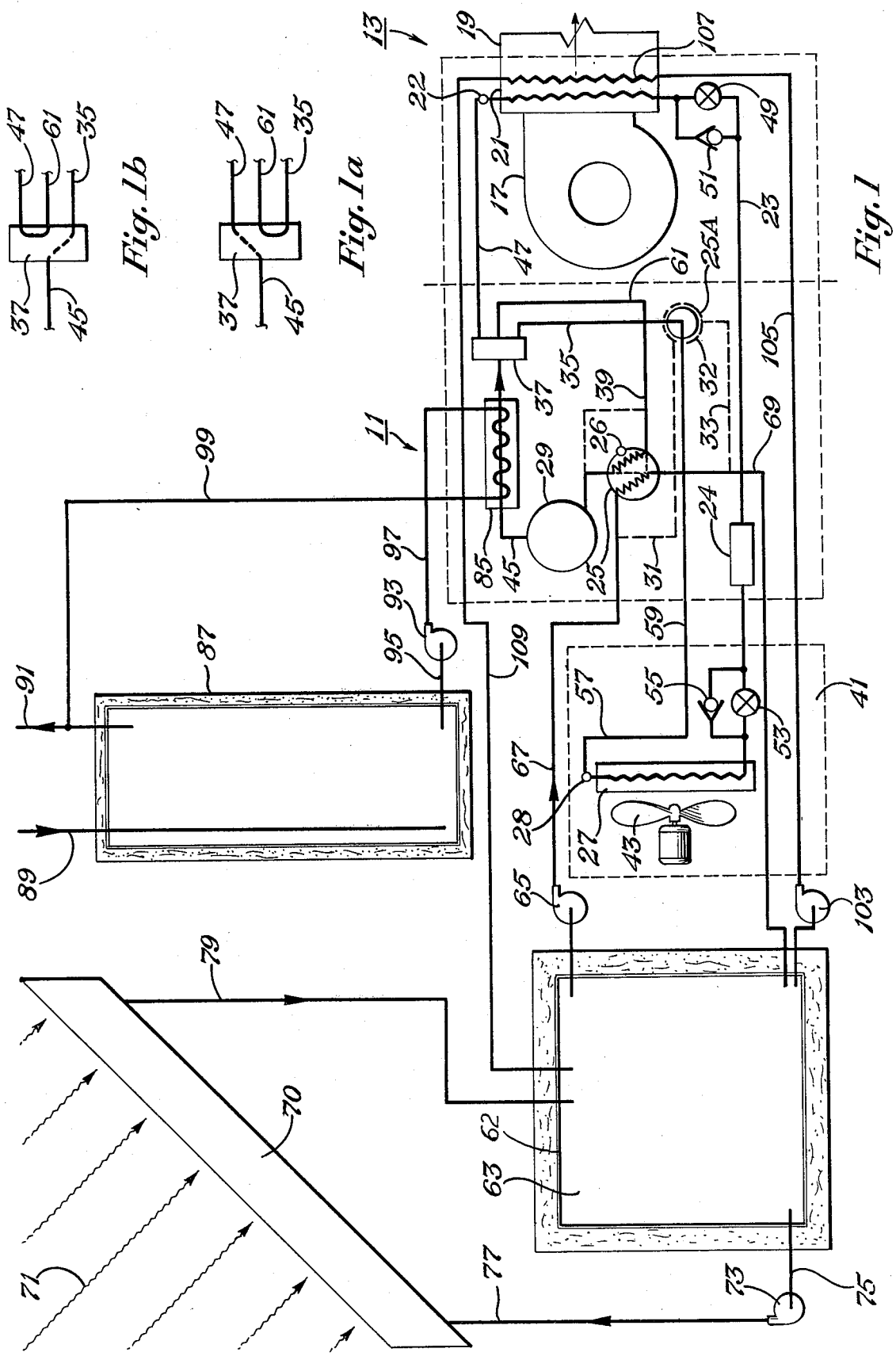
FIG. 1 is a schematic illustration of an apparatus in accordance with one embodiment of this invention.

Referring to FIG. 1 for a clearer understanding of the invention, the apparatus 11 includes an air handler and air path means 13 that comprises an air blower 17 that is connected with a plenum 19. The air blower 17 may comprise any of the conventional air handlers such as the so called "squirrel cage" blowers that are powered, directly or by suitable intermediate links, with an electric motor or the like. These blowers and motors are powered for circulating the requisite quantity of air throughout the enclosed space to be conditioned; for example, a building or the like.

The plenum 19 may comprise any of the prior art types of plenums. As illustrated, it is a sheet metal or fiberglass major duct with tributary ducts branching off it (the latter not being illustrated). The return to the suction side of the air blower 17 may be by separate ducts or by way of the building structure and suitable louvered inlets to the suction side of the air blower 17. With this technique, the air is able to be passed in heat exchange relationship with a refrigerant fluid.

As implied hereinbefore, the fluid under discussion is air being circulated in an enclosed space such as a building for air conditioning the building. It is apparent, of course, that any fluid could be circulated in heat exchange relationship with the refrigerant fluid but, for simplicity, the air conditioning application will be described hereinafter.

A first refrigerant-fluid (conditioned air) exchanger 21 is disposed on the discharge side of the air blower 17 so that the air is passed in heat exchange relationship with the refrigerant fluid that is passed interiorly through the coils of the exchanger 21. The first refrigerant-air heat exchanger 21 serves as an evaporator when the heat pump is being operated in the cooling mode and serves as a condenser when the heat pump is being operated in the heating mode. While the construction of the first heat exchanger 21 may take any of the suitable forms, it is preferable to employ conventional finned copper tube heat exchanger for highly efficient heat transfer regardless of whether the air is being heated or cooled.

In addition to the first refrigerant-air heat exchanger 21, the apparatus 11 also includes a second refrigerant-heat exchange fluid heat exchanger 25 and a third refrigerant-ambient air heat exchanger 27. As illustrated, the second refrigerant-heat exchange fluid heat exchanger 25 is connected immediately upstream of a compressor 29 such that it always serves as an evaporator when it is being employed as a heat exchanger.

Any of the conventional heat exchangers can be employed as the second heat exchanger 25. It is preferable, however to employ heat exchangers similar to that described in my hereinbefore referenced application Ser. No. 45,392 because of the advantages of that design. While the descriptive matter of that application has been incorporated herein by reference, the design will be reviewed briefly without reference to a drawing. Specifically, the heat exchanger-accumulator of that application included an upright pressure vessel having a top, bottom and side walls; an inlet conduit sealingly penetrating through the top so as to discharge refrigerant downwardly along the side wall; a tubular overflow chamber disposed within the vessel and sealingly connected with the bottom so as to define an annular and outer volumetric chamber for receiving the refrigerant such that liquid will settle toward the bottom; a heat transfer coil disposed in the annular volumetric chamber for vaporizing the liquid refrigerant, allowing the vaporized refrigerant to escape upwardly from the liquid refrigerant; and a refrigerant discharge conduit means for the effluent refrigerant; the refrigerant discharge conduit penetrating sealingly through the top and extending downwardly adjacent the bottom and back upwardly to have its inlet end adjacent the top of the vessel so as to take refrigerant gases. In that invention, the refrigerant discharge conduit means had metering passageways penetrating laterally through its walls near the bottom of the heat exchanger-accumulator for picking up a metered quantity of the liquid refrigerant and any oil in the bottom thereof. The second heat exchanger 25 is formed of the usual materials that are conventional to this art, preferably copper and brass constituents and elements in which heat transfer will be involved, although steel or the like can be employed for the other portions.

If desired, as shown in lines 31–33, the second heat exchanger 25 may be emplaced in the line 35 intermediate the reversing valve 37 and the third heat exchanger 27, instead of in the line 39 connected with the suction side of the compressor 29. When the second heat exchanger is placed in the alternate position labeled 25A shown by the dashed line 32, it can serve advantageously in certain instances, as will be apparent from descriptive matter hereinafter. Of course, when it is in the alternative position, the second heat exchanger 25 is not installed also on line 39 as shown in FIG. 1, except in extraordinary circumstances.

The third refrigerant-ambient air heat exchanger 27 is ordinarily emplaced in a separate compartment, such as exteriorly of the enclosure and shown by the dashed compartment 41. As indicated hereinbefore, the third heat exchanger 27 is connected in series with the first heat exchanger 21 and the second heat exchanger 25. The third heat exchanger 27 may be employed to reject heat when the apparatus 11 is operated in the cooling mode. Alternatively, it can be employed to pick up heat when the apparatus 11 is operated in the heating mode. A fan 43 is provided and powered by a suitable electric motor or the like to circulate the ambient air in heat exchange relationship with the refrigerant in the third heat exchanger 27. The heat exchanger, as described with respect to the first heat exchanger 21, preferably comprises finned copper tubes or the like to afford highly efficient heat transfer, yet afford trouble free operation for a long period of time. Any of the other conventional forms, such as the aluminum tube or the like, can be employed, although they are more suceptible to corrosive effects of moisture and the like.

The compressor 29 may take the form of any of the conventional compressors. Preferably, it is a rotary compressor such as a rolling piston rotary compressor, a rotary vane type compressor or the like that is designed to compress the refrigerant gas at the pressure ratio efficiently as described in my hereinbefore reference co-pending application Serial Number 50,548.

The discharge side of the compressor 29 is connected by tubing 45, 47 with the inlet side of the first refrigerant-air heat exchanger 21. This completes a refrigerant circuit for heating mode operation and allows efficient transfer of heat from a heated fluid serving as a heat exchange fluid source into the air being circulated within the space to be heated.

As indicated hereinbefore, a throttling valve is connected at the inlet side of the heat exchangers 21 and 27. For example, when the first refrigerant-air heat exchanger 21 is being employed as an evaporator in the cooling mode there is provided a throttling valve 49 that is connected in parallel with a check valve 51 such that the check valve blocks the flow from the line 23 and allows the throttling valve 29 to throttle flow into the heat exchanger 21 to keep it operating efficiently as an evaporator. Utilizing a thermo-electric expansion valve, refrigerant metering is controlled via a thermistor bulb 22, located at the exit of heat exchanger 21.

Conversely, a throttling valve 53 is connected in parallel with a check valve 55 at the inlet to the third heat exchanger 27 such that the check valve 55 blocks flow of fluid from the line 23, allowing the throttling valve 53 to meter liquid refrigerant into the heat exchanger 27 when it is being operated as an evaporator, as in the heating mode. In this case, electric throttling valve 53 is controlled by thermistor bulb 28 located in the heat exchanger discharge line.

When vaporization of refrigerant in the second heat exchanger 25, is desired as in the water source heating mode, an electrical relay switches the thermistor controlling expansion valve 53 to thermistor bulb 26 located on heat exchanger 25 and acting as a liquid level control device.

The side of the third refrigerant-ambient air heat exchanger 27 is connected as by lines 57, 59, 35 with the reversing valve 37. The middle discharge port of the reversing valve 37 is then connected by way of lines 61, 39 with the second heat exchanger illustrated in the primary placement in FIG. 1.

The reversing valve 37 is simply a solenoid operated valve in which a plunger directs the refrigerant to one of two paths depending upon whether it is in the cooling or heating mode. As illustrated in FIG. 1b, the refrigerant may flow from line 45 to line 35 in the cooling mode and the line 61 is connected with the line 47. On the other hand, as shown by FIG. 1a, in the heating mode, the line 45 is connected with the line 47 to send the hot refrigerant to the first heat exchanger 21 instead of the third heat exchanger 27 as in the cooling mode. Conversely, the line 61 is connected with the line 35 in the heating mode such that the second heat exchanger 25 can increase the suction pressure by heat exchanging the refrigerant with the heat exchange fluid.

Depending upon the design of the refrigerant heat exchanger 21, 25 and 27, a liquid refrigerant receiver 24, interposed in liquid line 23 between the indoor and outdoor sections may be required because of the varying requirements for refrigerant charge when operating in the various modes. The inclusion of a receiver in these systems does not reduce heat pump performance; it merely aids in proper refrigerant management.

The heat exchange fluid side of the second refrigerant-heat exchange fluid heat exchanger 25 is connected into a heat exchange fluid circuit that includes a source of heat exchange fluid in the storage tank 62; heat exchange fluid circulating means in the form of pump 65, and inlet and outlet conduits 67, 69.

The storage tank 62 holds a heat exchange liquid 63. The heat exchange liquid may comprise water although an aqueous solution of antifreeze like ethylene glycol, diethylene glycol, triethylene glycol or propylene glycol can be used. Generally, the fluid in the solar collector 70 will be an antifreeze solution to prevent difficulties with freezing. If desired, an isolation heat exchanger may be employed in conjunction with either the storage fluid or hot water, per se. In such a case, the storage fluid may be water. An additional heat exchanger and pump, as implied may be required to transfer heat from the collector fluid into the storage medium in such a case. Ordinarily, the temperature of the liquid in the storage tank 63 may be in the range of 35°-140° depending upon the heating source availability.

As a heating source in the illustrated embodiment, one or more solar collectors 70 are employed to receive the suns rays, shown by arrows 71, to heat the fluid being circulated through the solar heat exchanger, or solar collector, 70. A pump 73 has its suction side connected with the interior of the storage tank 63 by way of conduit 75 and has its discharge connected with the inlet to the solar collector by way of conduit 77. A return conduit 79 connects the discharge side of the solar collector 70 with the interior of the storage tank 63. Thus, when the solar collector is very efficient, a high temperature liquid can be stored in the storage tank 62 for raising the evaporator temperature.

Figure 5:
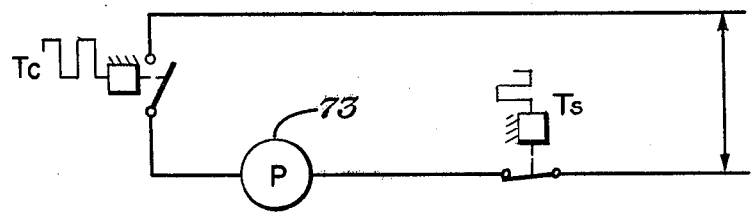
FIG. 5 is a control circuit diagram for the solar system.

The solar collector heating can be scheduled to operate independently of the remainder of the heat pump system or it can be scheduled to operate in conjunction therewith. The preferred embodiment is the simple embodiment illustrated in FIG. 5. Therein, the control circuit using the conventional 115 volt alternating current or the like is employed with switches responsive to the temperature of the storage $T_S$ and serially connected therewith the temperature of the collector $T_C$. Specifically, when the temperature of the collector becomes greater than the temperature of storage by certain temperature differential, for example 5° F., pump 73 is energized and remains energized until either of two things occurs. First if there is no more temperature differential, as by the temperature at the collector falling because the sun goes down, the pump 73 is deenergized. Secondly, if the storage temperature reaches a maximum temperature, such as 150° F., the pump 73 is deenergized.

While solar collectors are shown as a source for heating the fluid above ambient temperatures for the heating mode any of the other sources of heat can be employed. Such other sources of heat may be at such a low potential that they are frequently neglected as being infeasible for commercial purposes. For example, stack gases can be employed to heat the heated fluid; geothermal fluids can be employed if they are available; and low pressure waste steam can be condensed to supply heat.

The refrigerant may comprise any of the commercially available materials suitable for the normal operating conditions. Ordinarily the refrigerants that are employed in the modern commerical community are polyhalogenated hydrocarbons. Typical of the refrigerants are R-12, dichlorodifluoromethane; R-22, monochlorodifluoromethane; or R-502. Other refrigerants are readily available to serve as required in any particular locale.

In the illustrated embodiment of FIG. 1 there is provided a desuperheater 85 adjacent discharge of compressor 29 to remove the superheat of compression. The desuperheater is a heat exchanger in which the hot refrigerant gas is passed interiorly of the coils on one side and the fluid such as hot water is passed on the other side. Specifically, the hot water storage tank 87 is provided for storing the water and has the usual incoming potable water line 89 and the hot water discharge line 91. A pump 93 has its suction connected with the storage tank 87 via conduit 95 and has its discharge side connected with the desuperheater 85 via conduit 97. Return from the desuperheater heat exchanger 85 is connected with the hot water line 91 via conduit 99. As will be clear if the water is not being used through the hot water line 91, the water flows interiorly of storage tank 87, replacing that pumped by pump 93 to increase the temperature of the water in the storage tank. Of course, suitable safety controls can be employed to prevent developing too high a temperature or pressure in the storage tank. The hot water storage tank coupled with a desuperheater adds a significant economic incentive to the use of the system of this invention.

The operation of the apparatus of FIG. 1 may be in a plurality of modes as follows: (1) air to air heat pump operation in the heating mode, (2) water to air heat pump operation in the heating mode. (3) simultaneous air and water source heat pump operation in the heating mode, (4) air to air heat pump operation in the cooling mode, (5) air to water heat pump operation in the cooling mode, (6) heating directly from storage, and, (7) cooling directly from storage.

The desuperheater 85 acts independently. Referring to FIG. 4 for the control circuit for the desuperheater 85, the water temperature sensor 94, FIGS. 1 and 3, senses the water temperature and provides a continuous circuit. This energizes the pump 93 when the compressor contactor 96 is energized, as by the compressor coming on. Thus, the water is circulated through the desuperheater 85 to remove the superheat of the hot compressed refrigerant and make it more nearly suitable for being flowed through the first heat exchanger 21 in heat exchange relationship with the air circulated by blower 17. Thus, for example, the desuperheater is operated when the system is operating in mode one inter alia.

Figure 6:
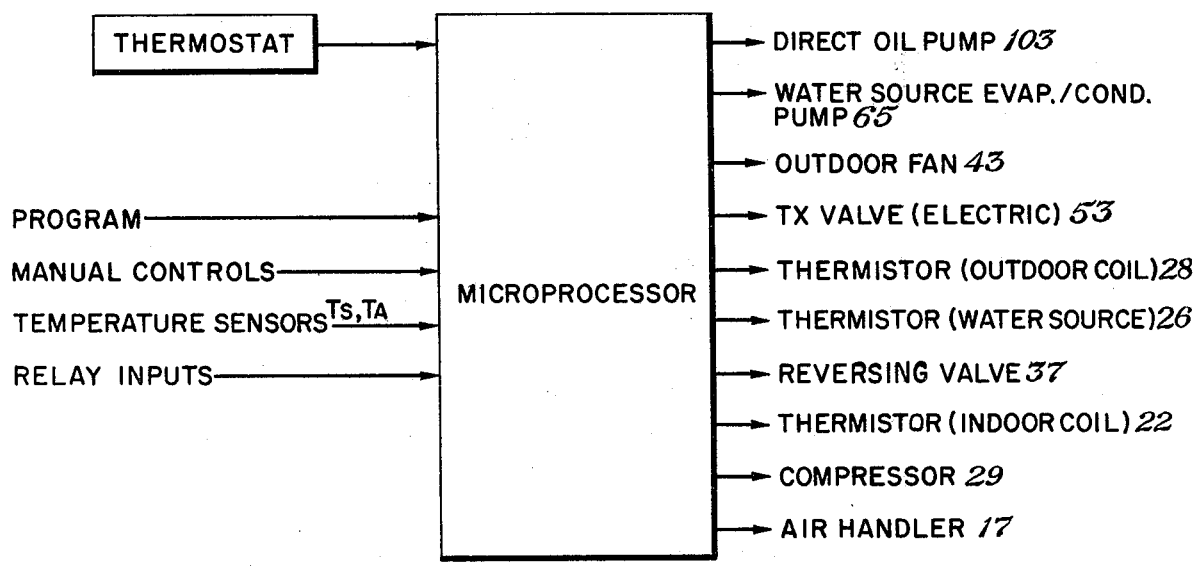
FIG. 6 is a control circuit diagram for the main heat pump system.

In operating in mode one, the operation is identical to that of a normal air to air heat pump operation. The control circuit for operating in mode one is indicated in FIG. 6 and Chart 1. As can be seen by referring to FIG. 6, the microprocessor is programmed for the various modes shown in chart 1. The input such as the manual override controls, temperature sensors, relay inputs and the like; as well as the primary input from the thermostat; are sent to the microprocessor. The microprocessor then interprets the inputs in accordance with the program and directs outputs to energize the respective elements shown for the respective modes. For example, if the temperature of ambient air shown in FIG. 1 as circle $T_A$ is greater than 45° F. and the temperature of storage $T_S$ is less than 100° F. the microprocessor goes into mode one. In mode one, if the thermostat signals the need for heating, the respective following elements are energized (see Chart 1): air handler 17, compressor 29, thermistor 28, thermal expansion (TX) valve 53, outdoor fan 43. The remaining listed elements (shown in Chart 1) are not energized and the conventional air to air heat pump operation is employed. In chart 1 the energized condition is indicated by a plus and the deenergized condition is indicated by a minus.

CHART I

| MODES | Air Handler 17 | Compressor 29 | Thermistor (Indoor Coil) 22 | TX Valve (Electric) 49 | Reversing Valve 37 | Thermistor (Water Source) 26 | Thermistor (Air-Outdoor Coil) 28 | TX Valve Electric 53 | Outdoor Fan 43 | Water Source Evap./Cond. Pump 65 | Direct Coil Pump 103 |
|---|---|---|---|---|---|---|---|---|---|---|---|
| 1. Air Source-HP (Heat Pump) Heating | + | + | − | − | − | − | + | + | + | − | − |
| 2. Water Source HP Heating | + | + | − | − | − | + | − | + | − | + | − |
| 3. Simultaneous Air & Water Source HP Heating | + | + | − | − | − | + | − | + | + | + | − |
| 4. Air Source HP Cooling | + | + | + | + | + | − | − | − | + | − | − |
| 5. Air-Water HP Cooling | + | + | + | + | + | − | − | − | − | + | − |
| 6. Heating from Storage | + | − | − | − | − | − | − | − | − | − | + |
| 7. Cooling from Storage | + | − | − | − | − | − | − | − | − | − | + |
| 8. Heating-Air Source HP & from Storage Simultaneously | + | + | − | − | − | − | + | + | + | − | + |

Specifically, the gaseous refrigerant is compressed by compressor 29 and sent through reversing valve 37 to the first heat exchanger 21. There the hot compressed refrigerant gives up heat to the air being circulated by the air handler, or blower 17. Consequently, the refrigerant is condensed and passes by way of check valve 51 to line 23 and thence to the throttling valve 53 and the third heat exchanger 27. As long as the third heat exchanger is running in a nonflooded condition and evaporating the refrigerant satifactorily, the gaseous refrigerant passes through lines 57, 59, 35, reversing valve 37 and line 61, 39 to the second heat exchanger 25. The second heat exchanger 25 operates merely as an accumulator in this mode.

In the second mode of operation, however, the ambient air temperature may be so low that the heat pump capacity has diminished to the point where additional capacity is required to meet the load. The efficiency of heat pump operation at the low capacity condition is also severely diminished and operation in the water source mode is desirable. In the second mode employing water source heat pump heating there is energized, upon signal from the thermostat, the air handler 17, the compressor 29, the thermistor 26 on the water source heat exchanger, the thermal expansion valve 53, and the water source evaporator/condenser (evap./cond.) pump 65. The remaining listed elements are deenergized. The primary signal to enter into this mode two will be temperature of the ambient $T_A$ below a predetermined temperature in the range of 10°–45° F. Obviously the lower the temperature the less efficient will be the air to air heat pump heating. Therefore, the exact temperature will be a function of how much sun is available for supplemental, or solar, heating. If there is adequate supplemental heating, the predetermined temperature for switching to the water source heating will be toward the upper limit or even at a higher temperature than the 45° F. upper limit. The operational result is as follows. Heat Exchanger 25 is used to source the heat pump via heat transfer with a heat exchange fluid. The benefit of the heated heat exchange fluid serves to raise the suction temperature for the compressor 29. This effects a low pressure ratio; that is, the ratio of the discharge pressure to the inlet pressure in terms of absolute pressure units. In this instance the heated water is circulated via pump 65 and conduits 67, 69 to the second heat exchanger 25 to vaporize the refrigerant therein.

The vaporized refrigerant is compressed by the compressor 29. The superheat is removed in desuperheater 85, as it is in the above described embodiment to heat the water in hot water tank 87, if required. When the temperature of the potable water in the storage tank is at the maximum desired level, pump 93 is de-energized. The hot compressed gases are then sent to the first heat exchanger 21 where the refrigerant is condensed giving up heat to the air being circulated to heat the building. The liquid refrigerant passes by way of the check valve 51 to the expansion valve 53. The expansion valve 53 controls the flow of liquid therethrough. This control is responsive to a liquid level control, or thermistor, 26 on the second heat exchanger 25. In the water source heat pump mode, the outdoor third heat exchanger fan 43 is shut off and the third heat exchanger 27 is operated in a flooded condition. Control of liquid refrigerant flow is switched to the level controller 26 on the second heat exchanger 25 using throttling valve 53. Pump 65 is energized, flowing heated water through the second heat exchanger 25. Rapid and intense boiling of the refrigerant occurs within this device. The gas passes to compressor 29, for compression. Thus a cycle is completed when the refrigerant is again vaporized in a second heat exchanger 25.

In operation in mode three, both the air and the water sources such as in the second and third heat exchanger 25 and 27 may be employed to vaporize the refrigerant and raise the suction pressure for the compressor 29 to efficiently compress the refrigerant at a low pressure ratio. As indicated hereinbefore with respect to mode two, there is some ambience in whether or not to use water or air source heating in the temperature range of the ambient between 10° and about 45°. There may be times when both air and water sources can be used advantageously. For example, there may be times when there will be cloudy days or unavailability of ready supplemental heat, yet there will be some availability of supplemental heat. Consequently, at another predetermined temperature the use of mode three is indicated. As can be seen in Chart 1, in mode three, the following elements are energized when signalled by need for heating by the thermostat: air handler 17, compressor 29, thermistor 26 on the water source heat exchanger, thermal expansion valve 53, outdoor fan 43, water source evaporator/condenser pump 65. The remaining listed elements are deenergized in mode 3. The result is that partial vaporization occurs in the outdoor heat exchanger when the outdoor fan circulates ambient air past the outdoor heat exchanger; and part of the evaporation of the refrigerant occurs in the second heat exchanger 25 where the heat exchange liquid, or water, supplies part of the heat. In this embodiment the thermistor 26, serving as a liquid level controller, operates the thermal expansion valve 53 to prevent flooding of the second heat exchanger and taking in of liquid refrigerant into the compressor. As is recognized, the compressor must not take a suction of liquid refrigerant or it will be damaged.

This mode may be of restricted use although it is readily available in this system without having to isolate a particular section of the refrigerant circuit, "pump down" a part of the refrigerant circuit or the like. The term "pump down" is widely known as being the isolating of a certain part of circuit and pulling the refrigerant out of that section of the refrigerant circuit for any one of several reasons, such as safe operation, efficient operation, preventing damage, or the like. In the past it has been necessary frequently to pump down an air refrigerant circuit when it is desired to change over to a water source heating circuit for the refrigerant in order to have enough refrigerant to operate safely and efficiently.

With the three first heat pump heating modes of operation, the reversing valve has been in a deenergized condition as used in this invention. In the summer operation, however, it is necessary to employ a cooling mode such as the fourth mode listed herein. As is recognized, when the system is switched from heating to cooling, it is ordinarily done through a manual switch, although the switching can be done with automatic switchovers from the temperature of the ambient air. The manual controls will be switched to cooling and, as indicated in Chart 1, the air source heat pump cooling cycle, or the fourth mode herein, is entered into. In this mode, the following elements are energized upon signal from the thermostat: air handler 17, compressor 29, thermistor 22, serving as a liquid level controller for the indoor coil, thermal expansion valve 49, reversing valve 37, outdoor fan 43. The remaining listed elements are in a deenergized condition. The result is as follows.

In operation in the fourth mode of air to air heat pump operation in the cooling mode, the refrigerant gas is compressed by compressor 29. The hot compressed refrigerant passes in heat exchange relationship with the water in the desuperheater 85. This time, however, as can be seen more clearly in FIG. 1b, the hot refrigerant gases from desuperheater 85 pass through the line 35 to the third heat exchanger 27. Heat is rejected to the ambient air being circulated by fan 43, condensing the refrigerant. The liquid refrigerant flows via the check valve 55 and line 23 to the throttling valve 49. The liquid refrigerant is allowed through the throttling valve 49 into the first heat exchanger 21. Thermistor 22 controls the throttling valve operation. The liquid refrigerant absorbs heat from the air being circulated by the blower 17, cooling the air and, consequently, the enclosure. As a consequence of this the refrigerant is, in turn, vaporized and passes by line 47, reversing valve 37 and line 61 to the second heat exchanger 25. Again, in the normal operation, the second heat exchanger 25 will operate merely as an accumulator.

There are times when it is advantageous to cool a supplemental reservoir to provide the ability to give supplemental cooling during periods of high cooling demand. The times may be, for example, late at night when there are periods of low electrical energy usage and the rates are advantageous for operating a heat pump for providing the supplemental cooling capability, such as for chilling water in a storage tank. This mode is designated mode five, or the fifth mode of air-water heat pump cooling. As can be seen in Chart 1, the following elements are energized by the microprocessor: air handler 17, compressor 29, thermistor 22, serving as a liquid level controller on the indoor coil, thermal expansion valve 49, reversing valve 37 and a water source evaporator condensor pump 65. The remaining listed elements are deenergized. The result is as follows.

In operation in the fifth mode wherein the apparatus 11 is employed to chill the water in the storage tank 63, the compressor compresses the gas which is sent to the third heat exchanger 27 outdoors. The refrigerant is condensed and the liquid refrigerant passed through the heat exchanger 21 in a flooded condition. Specifically, the blower 17 is not operated such that the warm liquid is flashed past the throttling valve 49 and passes through heat exchanger 21 to the second heat exchanger 25. The throttling valve 49 is now controlled by the liquid level control 26, as indicated hereinbefore. Thus the liquid refrigerant absorbs its latent heat of vaporization from the heat exchange fluid being circulated by pump 65 to chill the heat exchange fluid, such as the water 63 in the storage tank 62. As indicated, the advantage of this embodiment is that the water can be chilled during periods of low utility power demand to take advantage of economical electrical rates or the like. Subsequently, the chilled water is employed in lieu of the vapor compression equipment on the cooling cycle by being circulated through a chilled water circuit and heat exchanger. As illustrated, the chilled water circuit is shown as inclusive of pump 103, conduit 105, heat exchanger 107, and conduit 109 returning the heat exchanged water to the storage tank 63. The heat exchanger 107 may be interposed adjacent the first heat exchanger 21 or intertwined with the refrigerant circuitry in the same coil or in a separate portion of the air circulation system for conditioning the enclosure or the like.

Frequently there will be enough heat stored to enable the apparatus of this invention to supply heat directly from storage without running the heat pump, per se. This is referred to herein as mode six. When operating in mode six, as can be seen from Chart 1, the air handler 17 is energized upon signal from the thermostat as is the direct coil pump 103 to circulate the heat exchange liquid, hot water, through the first heat exchanger in heat exchange relationship with the air.

Conversely, as indicated hereinbefore there will be times when there will be excess capability for cooling as by having cold water in storage. At such times, the building or the like may be cooled by circulating the air in heat exchange relationship with the cold storage liquid if it has been chilled, as described hereinbefore with respect to mode five. This is essentially the same as mode six except that the cold liquid is circulated. As can be seen from Chart 1, again the air handler 17 and the pump circulating the chilled liquid, such as pump 103, is energized. The remaining elements in mode six and seven are deenergized. The entry of the system into mode six or seven may be done manually or may be signalled automatically. For example, if the temperature of the storage $T_S$ is greater than about 140° F. and the thermostat calls for heat, the system may be programmed to automatically enter into mode six to circulate the hot water from storage. Conversely, if the temperature of storage is less than a predetermined termperature such as about 50° F. and the thermostat signals cooling after the system has been switched to manual for cooling, or automatically to cooling by the temperature of the ambient $T_A$, mode seven is entered into.

As indicated, when operated in mode six or seven, the space is conditioned directly by circulating hot or cold water, depending on the season, by means of pump 103 through heat exchanger 107.

One of the advantages of this invention is that it is flexible enough to enable other combination modes to be employed. For example, if desired, if the temperature of the storage is less than 110° F. and the thermostat calls for heating the system may engage in both heating from storage and from an air source heat pump simultaneously, shown in Chart 1 as mode eight. When operated in mode eight, the following elements are energized: air handler 17, compressor 29, thermistor 28 and thermal expansion valve 53, serving as the liquid level controller on the outdoor coil over which outdoor air is blown by outdplpr fan 43 which is also energized; and the direct coil pump 103 to circulate the heat exchange liquid. In this mode, the liquid is circulated by pump 103 through the coil 107 in heat exchange relationship with the air blown by the blower 17. Simultaneously, hot compressed refrigerant is circulated through the heat exchanger 21 to be heat exchanged with the air and take heat from the outdoor coil 27 for vaporizing the refrigerant.

From the foregoing, it can be seen that the second refrigerant heat exchanger 25 adds a wide degree of flexibility to the system without causing pump down or isolation of a part of the system. Moreover, it is apparent that it can be moved to the location designated 25A with appropriate interconnection with the heat exchange fluid, shown by dashed lines 31 and 33, without adversely affecting the overall operation of the apparatus 11. In fact, in the event that the third heat exchanger 27 is inadequate to condense all of the refrigerant in the cooling mode, or if cooling by use of a water sink (water source heat pump) is desired, the second heat exchanger 25 may advantageously be placed upstream thereof to augment the condensation.

Figure 2:
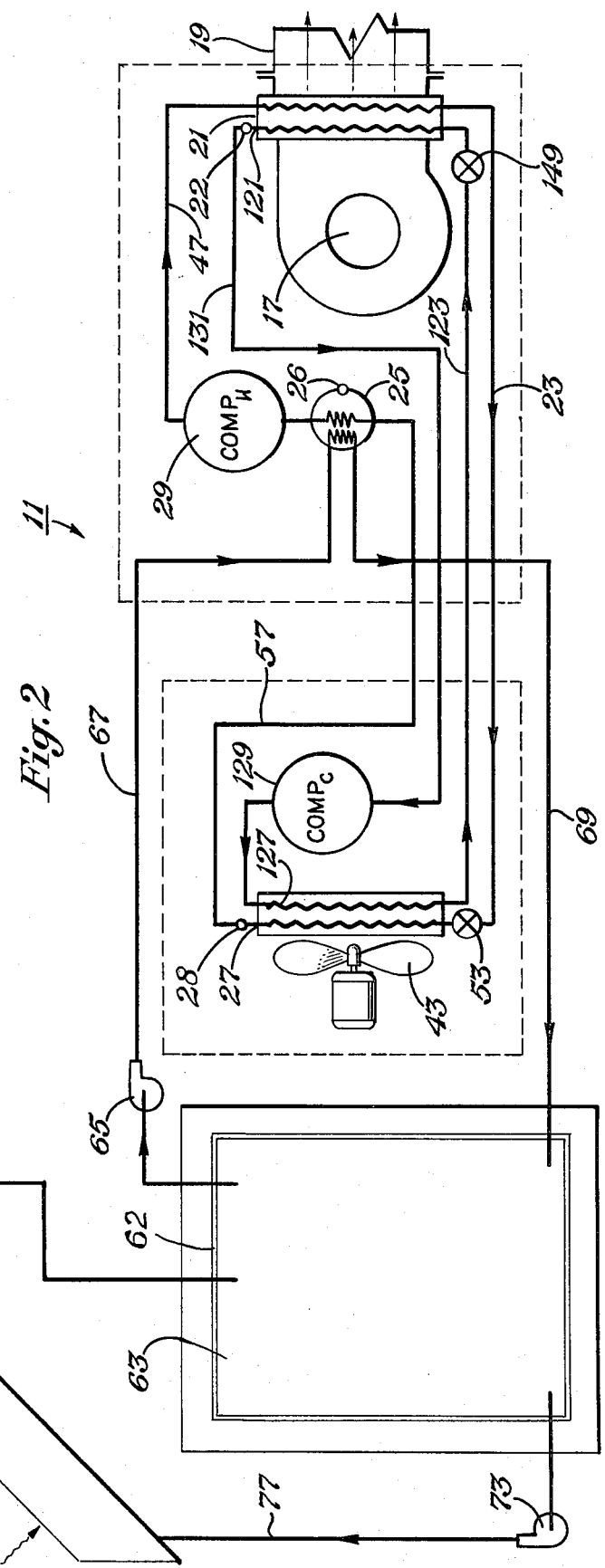
FIG. 2 is a schematic view of an apparatus in accordance with another embodiment of this invention employing dual refrigerant circuits, including dual compressors.

Another embodiment of this invention is illustrated in FIG. 2. Therein, elements that are like those shown in FIG. 1 are given the same reference numerals.

The desuperheater 85 and the hot water storage system is not shown in the embodiment of FIG. 2, although it can be employed downstream of the respective compressors.

Referring to FIG. 2, the compressor 29, the compressor for heating, is connected by way of conduit 47 with the first heat exchanger 21. The first heat exchanger 21 is then connected at its discharge via tubing 23 with the third heat exchanger 27. The fan 43 is employed to circulated the ambient air in heat exchanger relationship with the refrigerant. The throttling valve 53 is provided for throttling the liquid refrigerant through either the second or third heat exchanger 25 or 27 using thermistors 26 or 28 as described hereinbefore. The discharge of the third heat exchanger 27 is connected via conduit 57 with the second heat exchanger 25 immediately upstream of the compressor 29 to complete the refrigerant circuit. The heat exchange fluid storage tank 63 has its heating fluid circuit comprising pump 65, conduit 67, 69 for circulating the heat exchange fluid through the second heat exchanger 25. The solar collector 70 has its collector fluid circuit formed by pump 73, conduits 77, 79 for heating the heat exchange fluid in the storage tank 63, either directly as shown or by way of an isolation heat exchanger if the fluids being circulated are different.

The modes of operation of the embodiment of FIG. 2 are illustrated in Chart II. In this embodiment, the two compressors are labeled comp$_H$ for the heating compressor and comp$_C$ for the cooling compressor. The liquid level controllers 22, 28, and 26 are referred to as thermistors which control the respective upstream throttling valves 149 and 53 to prevent liquid being sucked into the respective compressors. When the apparatus of FIG. 2 is operated as an air source heat pump for heating, referred to as mode one herein, the following respective elements are energized: air handler 17, heat compressor 29, thermistor 28, thermal expansion valve 53, outdoor fan 43. The remaining listed elements are deenergized.

17, heat compressor 29, thermistor 26, expansion valve 53 and the water source heat pump 65. The remaining elements are deenergized. In this mode the compressor compresses the hot refrigerant gas which flows in heat exchange relationship with the air through the first heat exchanger 21. The refrigerant is liquefied and flows to the third heat exchanger 27. The third heat exchanger 27 runs in a flooded condition with refrigerant passing through conduit 57 to the second heat exchanger 25. The refrigerant is vaporized by the fluid being circulated through the second heat exchanger 25 so that only refrigerant gases pass to the compressor 29. Moreover, in this mode with the high temperature level of the fluid circulating through the second heat exchanger 25 relative to the ambient air, it is possible to keep a high suction pressure for the compressor 29 and enable efficient operation with a low pressure ratio.

The embodiment of FIG. 2 can also be operated in simultaneous air and water source heat pump operation, referred to herein and in Chart II as mode three. When operated in mode three, the following elements are energized: air handler 17, heat compressor 29, thermistor 26, thermal expansion valve 53, outdoor fan 43 and water source heat pump 65. The remaining elements are deenergized. In this embodiment, the refrigerant is vaporized in both the outdoor coil, or third heat exchanger, 27 as well as the second heat exchanger 25 to use heat from both the heat exchange liquid and the outdoor air.

As can be seen, with the described circuit, the apparatus 11 of FIG. 2 can be operated in modes one, two and three in either the air to air heat pump operation in the heating mode, water to air heat pump operation in the heating mode and simultaneous air and water sourced heat pump operation in the heating mode.

The embodiment of FIG. 2 can also be employed in

CHART II

| MODES | Air Handler | Heat Compressor | Cool Compressor | Thermistor | TX Valve | Thermistor | Thermistor | TX Valve | Outdoor Fan | Water Source Evap./Cond. Pump |
|---|---|---|---|---|---|---|---|---|---|---|
| 1. Air Source HP-Heating | + | + | − | − | − | − | + | + | + | − |
| 2. Water Source HP-Heating | + | + | − | − | − | + | − | + | − | + |
| 3. Air & Water HP Heating | + | + | − | − | − | + | − | + | + | + |
| 4. Cooling Air Source | + | − | + | + | + | − | − | − | + | − |
| 5. Cooling-H$_2$O Source | + | − | + | + | + | − | − | − | − | + |

In operation in mode one; Chart II, the compressor 29 compresses the hot refrigerant gases which are sent to the first heat exchanger 21. The blower 17 circulates the air therepast to heat up the air for conditioning the building; simultaneously liquefying the refrigerant. The liquid refrigerant flows to the third heat exchanger 27 where it is flashed past the throttling valve 53. In the first mode, air source heat pump operation, vaporization of the refrigerant occurs in the third heat exchanger 27 which is in communication with the ambient air. In this instance, the second heat exchanger 25 operates merely as an accumulator.

Under conditions when the ambient temperature is low and the storage system is adequately charged, it is beneficial to operate in the water source mode. This is referred to herein as mode two which uses water source heat pump heating. As can be seen in Chart II, in this mode the following elements are energized: air handler the cooling modes, referred to in Chart II as modes four and five. The cooling can be using air to condense the refrigerant or using water to condense the refrigerant. The air source cooling is referred to as mode four in Chart II. In mode four the following elements are energized: air handler 17, cool compressor 129, thermistor 22, thermal expansion valve 149 and outdoor fan 43.

In order to eliminate the reversing valve, a second compressor 129 is connected with a condensing heat exchanger 127 where the hot, compressed refrigerant gives up heat to ambient air being circulated by the fan 43. As a consequence, the refrigerant is condensed and sent via conduit 123 and throttling valve 149 to evaporator heat exchanger 121. The evaporator heat exchanger 121 is interposed in the path of the air or intertwined with the circuitry of heat exchanger 21. Liquid refrigerant passes the throttling valve 149 and absorbs heat from the air to cool the air to condition the enclosure or the like. As a consequence, the refrigerant is vaporized and passes by way of conduit 131 back to the suction side of the compressor 129.

If it is desired to operate the embodiment of FIG. 2 in a cooling mode using water as the cooling media, as on a hot day with the outdoor coil, a second heat exchanger 25 is connected in series with the discharge of the compressor and the outdoor heat exchanger 27 to enable condensing the refrigerant upstream of the thermal expansion valve 149 by the refrigerant circulating in heat exchange relationship with the heat exchange liquid pumped by the pump 65. This connection is not shown in FIG. 2. Such a mode of operation is shown in Chart II as mode five. In mode five, the following elements are energized: air handler 17, cool compressor 128, thermistor 22, thermal expansion valve 149 and water source heat pump 65 having the supplemental second heat exchanger 25 connected into its circuit.

Figure 3:
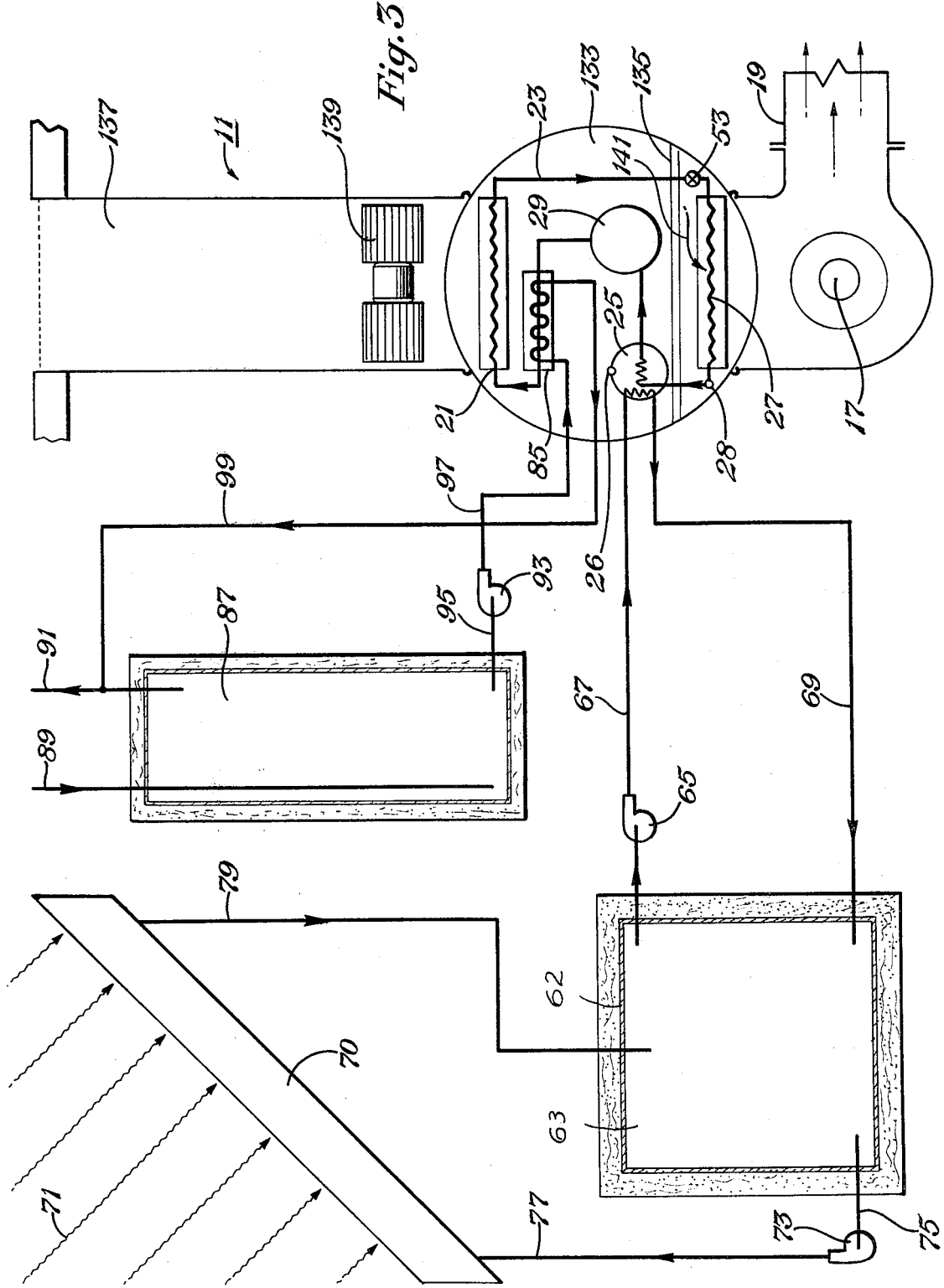
FIG. 3 is a schematic illustration of still another embodiment of this invention employing a reversing means.
Figure 4:
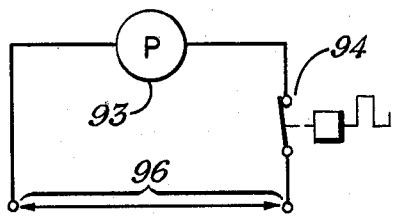
FIG. 4 is a schematic illustration of a control circuit diagram for the desuperheater.

While a desuperheater is not shown in the embodiment of FIG. 2, the desuperheater such as illustrated in FIGS. 1 and 3 can be employed to remove the compression superheat of the refrigerant advantageously. In such event, the desuperheater is installed downstream of the one or more compressors in FIG. 2 such that the superheat of the hot compressed refrigerant gases is advantageously used to heat water such as domestic hot water or the like.

The advantages of the embodiment of FIG. 2 are several as follows: 1. there is an advantage in the simplicity of the circuit and trouble free operation; 2. it enables varying the heating and cooling performance and capacity independently; 3. it enables maximizing heating and/or cooling performance by optimizing refrigerant circuitry and heat exchangers for a single purpose; i.e., condensing or evaporation; and 4. it eliminates the deleterious operation and heat transfer of a reversing valve. The unusual flexibility allows reversal of the respective roles of the first and third heat exchangers without adverse effects to system performance because of the capabilities of the second heat exchanger 25.

Another embodiment is illustrated in FIG. 3. The elements similar to those of FIG. 1 have been given the same reference numerals to prevent having to duplicate details in this already lengthy specification. Specifically, the apparatus 11 includes the compressor 29 that is connected with the first heat exchanger 21 by way of the desuperheater 85. The desuperheater 85 is connected with the water storage tank 87 and the respective hot water circulation system includes serially connected conduit 95, pump 93 and conduits 97 and 99. The conduits 97 and 99 incorporate flexible tubing so as to be able to accommodate 180° rotation of a reversing means 133 on which are mounted the desuperheater 85, the compressor 29 and the first heat exchanger 21. The suction side of the compressor 29 is connected to the second heat exchanger 25 which is also located on the reversing means 133. The reversing means includes an insulating wall 135 to separate the heat emitting elements from the cold elements, such as the third heat exchanger 27.

The second heat exchanger 25 has its heat exchange fluid circuit formed by the pump 65 and conduits 67, 69 for pumping the heat exchange fluid 63 from the storage tank 62. As described hereinbefore, solar collectors 70 are employed to heat the water when a heated fluid is desirable. The heat exchange circuit is effected by conduit 75, pump 73, conduits 77, 79 to heat the water directly as shown or by way of an isolation heat exchanger if the fluids are different in the solar collector circuit and the heat exchange fluid circuit. The conduits 67, 69 incorporate flexible tubing so as to accommodate at least 180° rotation of the reversing means 133. In the illustrated embodiment, ambient air may be circulated through the path 137 by squirrel cage blower, shown schematically was 139, or the like for flowing ambient air in heat exchange relationship with refrigerant in one of the heat exchangers 21, 27. As illustrated, the heat pump is positioned in the cooling mode and the heat exchanger 21 is interposed such that the ambient air is flowed in heat exchange therewith to condense the refrigerant. The refrigerant then passes by way of tubing 23 to the third heat exchanger 27 which is interposed in the path of the air being circulated by the blower 17 in the plenum 19. As will be evident and implicity described hereinbefore, the air is circulated back through the suction side, as indicated by the arrows 141. Thus in operation, the compressor 29 takes its suction from the second heat exchanger and compresses the gaseous refrigerant to a high pressure gaseous refrigerant that is condensed in the exchanger 21. Ambient air is circulated past the exchanger 21 in heat exchanger relationship with the hot high pressure compressed refrigerant to condense it. The liquid refrigerant flows through the throttle valve 53 into the third heat exchanger 27. Air is being circulated therepast for cooling the enclosure. The air gives up its heat, being cooled in the process. The refrigerant absorbs the heat by vaporizing. It passes on to the heat exchanger 27 and, thence, to the second heat exchanger 25. The second heat exchanger 25 acts as an accumulator in the cooling mode. The refrigerant then passes to the compressor 29 to complete a cycle.

The use of the heat exchange fluid in the second heat exchanger 25 insures a high suction pressure and ultimately a low pressure ratio for efficient compression.

When the reversing means 133 is reversed, the heat exchanger 21 is interposed in the path of the air being circulated for conditioning the building, as for heating the building. Conversely, the third heat exchanger 27 is interposed in the path of the ambient air being circulated by the blower 139. In this mode of operation, the hot compressed gases are sent to the heat exchanger 21, now located 180° from the position illustrated in FIG. 3 and in the path so as to have the conditioning air being flowed in heat exchange relationship therewith. The conditioned air is heated by cooling and condensing the refrigerant. The liquid refrigerant is then flowed through the insulating wall and to the third heat exchanger 27 which is now interposed in the path of the ambient air being circulated by the blower 139.

The advantage of this system is that the heat producing means such as the second heat exchanger 25, the compressor 29 and the first heat exchanger 21 are all on the same side of the insulating wall 135 such that air for conditioning the enclosure can be flowed therepast to carry the heat away for efficient operation and use the heat in heating the building. In addition, this system has the same performance advantages as set forth in the embodiments of FIG. 2 with the exception that the heating and cooling capacity can not be independently varied. Furthermore, only a single refrigerant expansion valve is required.

The advantages of the system described and illustrated in FIGS. 1-3 are many. Some of the advantages are as follows. (1) The simplicity of the refrigerant circuitry is maintained; this is of paramount importance insofar as equipment realibility is concerned. (2) The apparatus 11 affords a most efficient means of transferring heat by way of the refrigerant from multiple sinks and sources. (3) These systems are basically a high performance heat pump in series configuration with a solar or alternate source with an air to air heat pump as a backup system as opposed to the electrical strip heating backup of the conventional prior art systems. (4) Cooling performance is excellent since heat is transferred directly to the outdoor heat sink. (5) Defrosting of the outdoor coil can be accomplished by one of two methods, each of which being substantially more efficient that the conventional reverse cycle defrost of air source heat pumps. This latter advantage may require some supplemental explanation.

There are two methods, method one being an automatic defrost and method two being a solar source reverse cycle defrost.

In the automatic defrost method, the dual source systems will be sourced with water and will be operating with an evaporator temperature of, for example, 60° F. in the second heat exchanger 25. The outdoor coil, heat exchanger 27 will be flooded with warm liquid at about 60° F. The ensuing heat transfer, though at a fairly low rate, should be sufficient to maintain a dry outdoor coil during the water source mode of operation.

With respect to the second method, the major performance penalty occuring during a conventional reverse cycle defrost results from the requirement to operate the indoor air handler and electric strip heat to provide heat source during this cycle as well as the heat pump compressor. This is quadruply penalizing in that the air being circulated, if any, during this interval cools the enclosure undesirably. On the contrary, with this invention the indoor section can be deenergized and the second heat exchanger 25 used to vaporize the refrigerant, thus providing the heat source for defrost without penalizing the air conditioning system or providing discomfort to people in the enclosed space. Expressed otherwise, the defrost cycle operates substantially as the chilled water (summer cooling) cycle except the outdoor fan 43 is de-energized.

(6) The second heat exchanger provides for increased effective surface area in the indoor coil as suction pressure rises. When normal heat pump is operating in the heating mode, excess refrigerant is held within the indoor coil awaiting transport to the evaporator, thus reducing the available heat transfer area in the condenser. With the multiple heat exchanger systems, the outdoor coil can run flooded and reduce the liquid refrigerant held in indoor coil and increase the area available for heat transfer. This is required when operating at higher suction conditions for maintance of low head pressures.

Of important significance in the future is the possibility of employing the second heat exchanger in retrofitting existing heat pumps to provide performance boost by use of energy assist, such as solar assist or by any other source of low grade or waste heat. The effective realization of the savings will depend largely upon the simplicity of the control system for the second heat exchanger.

From the foregoing, it can be seen that this invention provides the object delineated hereinbefore and alleviates the disadvantages of the prior art system.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

What is claimed is:

1. Apparatus for conditioning a fluid temperaturewise comprising:
   a. a fluid handler and fluid path means for circulating said fluid in a path in heat exchange relationship with a refrigerant fluid;
   b. at least three refrigerant heat exchangers; a first of the heat exchangers having parallel-connected and alternatively operable first throttling means for throttling refrigerant flow and a first by-pass therefor, said first heat exchanger being disposed in the path of the fluid such that the fluid is passed in heat exchange relationship with said first heat exchanger when said fluid handler is operative, a second of the refrigerant heat exchangers having a liquid level controller controlling a throttling means upstream of said heat exchanger to prevent flooding thereof and being disposed in a heat exchange fluid circuit for circulating the refrigerant in heat exchange relationship with a heat exchange fluid, and a third of the heat exchangers having parallel-connected and alternatively operable second throttling means for throttling the refrigerant flow and second by-pass therefor, said third heat exchanger being disposed in a path of ambient air for circulating said refrigerant in heat exchange relationship with the ambient air;
   c. a compressor connected into a refrigerant circuit for efficiently compressing the refrigerant from its inlet pressure to its discharge pressure under conditions of operation of the refrigerant circuit;
   d. ambient air blower for circulating said ambient air in heat exchange relationship with the refrigerant in said third heat exchanger;
   e. a refrigerant circuit serially connecting said at least three heat exchangers and said compressor and defining a flow path for said refrigerant;
   f. means including a reversing valve for selecting the heat exchangers and direction of flow of refrigerant therethrough for selecting a particular mode of operation of the apparatus:
   g. refrigerant disposed in said refrigerant circuit and adapted to be circulated in a selected flow path for transferring heat at a coefficient of performance greater than one;
   h. a source of heat exchange fluid;
   i. heat exchange fluid circulating means for circulating said heat exchange fluid in a heat exchange circuit and in heat exchange relationship with said refrigerant;
   j. a heat exchange circuit serially connecting said heat exchange fluid source, circulating means and second heat exchanger;
   k. control means for controlling respective modes of operation;
the element a-j being connected together in respective circuits and with said control means so as to be operable in at least the following modes, one operational cycle being indicated in each mode interconnection:

l. air to fluid heating in which said elements are connected serially compressor to reversing valve to first heat exchanger, with said first by-pass operative and with said fluid handler operative, to second throttling means to third heat exchanger, with said second throttling means controlling the liquid level in said third heat exchanger and with said ambient air blower operative, to second heat exchanger back to compressor;

m. heat exchange fluid to fluid heating in which said elements are connected serially compressor to reversing valve to first heat exchanger, with said first by-pass operative and with said fluid handler operative, to second throttling means to third heat exchanger, operating in flooded condition with said ambient air blower deenergized to second heat exchanger, with said liquid level controlling said second throttling means and with said heat exchange fluid circulating means operative to circulate said heat exchange fluid through said second heat exchanger and effect a low compression pressure ratio across said compressor, back to said compressor;

n. air and heat exchange fluid to fluid heating in which said elements are connected serially compressor to reversing valve to first heat exchanger with said first by-pass operative and with said fluid handler operative, to second throttling means to third heat exchanger, with said second throttling means controlling the liquid level of refrigerant therein and with said ambient air blower operative, to second heat exchanger with said heat exchange fluid circulating means operative to circulate said heat exchange fluid through said second heat exchanger and effect a low compression pressure ratio across said compressor and with said liquid level control imposing safety control on said second throttling means to prevent flooding of said second heat exchanger, back to said compressor; and o. air to fluid cooling in which said elements are connected compressor to reversing valve to third heat exchanger, with second by-pass operative, to first throttling means to first heat exchanger, with first throttling means operative to control liquid level in said first heat exchanger and with fluid handler operative, to second heat exchanger back to compressor.

2. The apparatus of claim 1 wherein a fourth chilled liquid-fluid heat exchanger is connected in a chilled liquid circuit serially with a chilled liquid storage and circulating means and said fourth heat exchanger is disposed in said fluid path for circulating said fluid in heat exchange relationship with said chilled liquid for supplemental cooling during high cooling and high electrical demand periods and said elements a–j are connected with said control means and in respective circuits so as to be operable in an additional mode of air to chilled liquid to fluid cooling in which said elements are connected serially compressor to reversing valve to third heat exchanger, with said second bypass operative to first throttling means to first heat exchanger, operating in flooded condition with said fluid handler off, to second heat exchanger, with said liquid level controller controlling said first throttling means to control the level of liquid refrigerant in said second heat exchanger and with heat exchange fluid circulating means operative to circulate heat exchange fluid to be chilled to form a chilled liquid, said chilled liquid being stored with said chilled liquid circulating means operative as desired to circulate said chilled liquid through said fourth heat exchanger to cool said fluid.

3. The apparatus of claim 1 wherein a desuperheater is connected into said refrigerant circuit downstream of said compressor and upstream of said reversing valve; said desuperheater also being connected in a hot water circuit serially with a hot water storage and means for circulating said water for heating said water when said water is circulated in heat exchange relationipl with the hot compressed refrigerant gas.

4. The apparatus of claim 1 wherein the elements a-k are adapted to operate in the air to fluid heating mode, said first heat exchanger is connected with the discharge side of said compressor so as to circulate hot compressed refrigerant gas though said first heat exchanger in heat exchange relationship with said fluid; said fluid handler is energized to circulate said fluid; said second throttling means is connected so as to control the liquid refrigerant in said third heat exchanger responsive to a liquid level controller; said third heat exchanger has said liquid refrigerant and outside air flowed therethrough in heat exchange relationship so as to vaporize said refrigerant; and said second heat exchanger serves as an accumulator.

5. The apparatus of claim 1 where in the elements a-k are adapted to operate in the heating fluid to fluid heating mode, said first heat exchanger is connected with the discharge side of said compressor so as to circulate hot compressed refrigerant gas through said first heat exchanger in heat exchange relationship with said fluid; said fluid handler is operative to circulate said fluid; said liquid level controller is connected so as to control the liquid refrigerant in said second heat exchanger; said third heat exchanger is operated in a flooded condition with its ambient air blower deenergized; said second heat exchanger has said heat exchange fluid and said refrigerant circulated therethrough in heat exchange relationship so as to vaporize said refrigerant.

6. The apparatus of claim 1 wherein the elements a-k are adapted to operate in the air to fluid cooling mode, said third heat exchanger is connected with the discharge side of said compressor with its ambient air blower energized so as to give up heat to ambient and condense said refrigerant; said first throttling means is connected so as to control the liquid refrigerant in said first heat exchanger responsive to a liquid level controller; said first heat exchanger has said fluid and said refrigerant flowed therethrough in heat exchange relationship to vaporize said refrigerant and cool said fluid; said second heat exchanger serving as an accumulator.

7. The apparatus of claim 1 wherein there is included a second compressor and a second refrigerant circuit, said first and third heat exchangers have dual heat exchange means operable respectively and selectively as an evaporator and as a condenser and as a condenser and as an evaporator, and connected respectively into the respective refrigerant circuits such that no reversing valve is necessary to operate in the respective heating and cooling modes; said second heat exchanger being connected into said first refrigerant circuit upstream of said first compressor for operating in the heating mode.

8. The apparatus of claim 1 wherein there is provided a reversing structure having an insulated divider; said compressor and said second and third heat exchangers are located on a first side of said insulated divider on said reversing structure; said first heat exchanger is located on a second side of said insulating divider on said reversing structure; a first forced air blower and air path are disposed so as to circulate ambient air past one of said heat exchangers which is acting as a condenser in the cooling mode or which is acting as an evaporator in the heating mode; said reversing structure being disposed adjacent said air path and said fluid path and reversible so as to interpose selectively said first and third heat exchangers in, respectively, said air path and said fluid path and, vice versa, said fluid path and said air path such that said first and third heat exchangers can be designed at optimum design conditions for operating as condenser and evaporator and are physically moved into respective air and fluid paths by reversing said reversing means.

9. The apparatus of claim 8 wherein each of said heat exchanger fluid lines include at least a flexible portion so as to accomdate at least one hundred and eighty degrees (180°) of rotation of said reversing means.

* * * * *